United States Patent
Kuo et al.

(10) Patent No.: US 12,462,413 B2
(45) Date of Patent: Nov. 4, 2025

(54) METHOD FOR TRAINING AUTOENCODER, ELECTRONIC DEVICE, AND STORAGE MEDIUM

(71) Applicant: HON HAI PRECISION INDUSTRY CO., LTD., New Taipei (TW)

(72) Inventors: Chin-Pin Kuo, New Taipei (TW); Chih-Te Lu, New Taipei (TW); Tzu-Chen Lin, New Taipei (TW); Jung-Hao Yang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 325 days.

(21) Appl. No.: 18/072,513

(22) Filed: Nov. 30, 2022

(65) Prior Publication Data

US 2023/0401733 A1 Dec. 14, 2023

(30) Foreign Application Priority Data

Jun. 9, 2022 (CN) .......................... 202210654050.6

(51) Int. Cl.
*G06K 9/00* (2022.01)
*G06T 7/593* (2017.01)

(52) U.S. Cl.
CPC .... *G06T 7/593* (2017.01); *G06T 2207/10028* (2013.01); *G06T 2207/20081* (2013.01); *G06T 2207/20221* (2013.01); *G06T 2207/30252* (2013.01)

(58) Field of Classification Search
CPC . G06T 7/593; G06T 2207/20221; G06T 7/55; G06T 2207/10012; G06T 2207/20228; G06T 2207/10028; G06T 2207/30252; G06T 2207/20081; G06T 2207/20084; G06N 3/04; G06N 3/08; H04N 13/00; H04N 2013/0074; H04N 2013/0085; H04N 13/106
See application file for complete search history.

(56) References Cited

U.S. PATENT DOCUMENTS

2008/0159638 A1* 7/2008 Song .................... H04N 19/192
382/233
2019/0101917 A1* 4/2019 Yao .......................... G06N 3/04

FOREIGN PATENT DOCUMENTS

| CN | 110766732 | 2/2020 |
| TW | 201004818 | 2/2010 |
| TW | 201937906 | 9/2019 |

* cited by examiner

*Primary Examiner* — Duy M Dang
(74) *Attorney, Agent, or Firm* — ScienBiziP, P.C.

(57) ABSTRACT

A method for training an autoencoder implemented in an electronic device includes obtaining a stereoscopic image as the vehicle is in motion, the stereoscopic image includes a left image and a right image; generating a stereo disparity map according to the left image; generating a predicted right image according to the left image and the stereo disparity map; and calculating a first mean square error between the predicted right image and the right image.

15 Claims, 6 Drawing Sheets

METHOD FOR TRAINING AUTOENCODER, ELECTRONIC DEVICE, AND STORAGE MEDIUM

FIELD

The subject matter herein generally relates to image processing, and particularly to a method for training an autoencoder, an electronic device, and a storage medium.

BACKGROUND

Assisted driving or autonomous driving in vehicles is widespread. During autonomous driving or partially assisted driving, it is necessary to determine the vehicle's distance from pedestrians, other vehicles, and all obstacles through depth perception, and perform operations according to the distances from the vehicle.

A stereo camera is usually required to obtain a depth image, and the depth image is obtained from left and right images of the stereo camera. However, the stereo camera is costly, and the applicability is poor.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
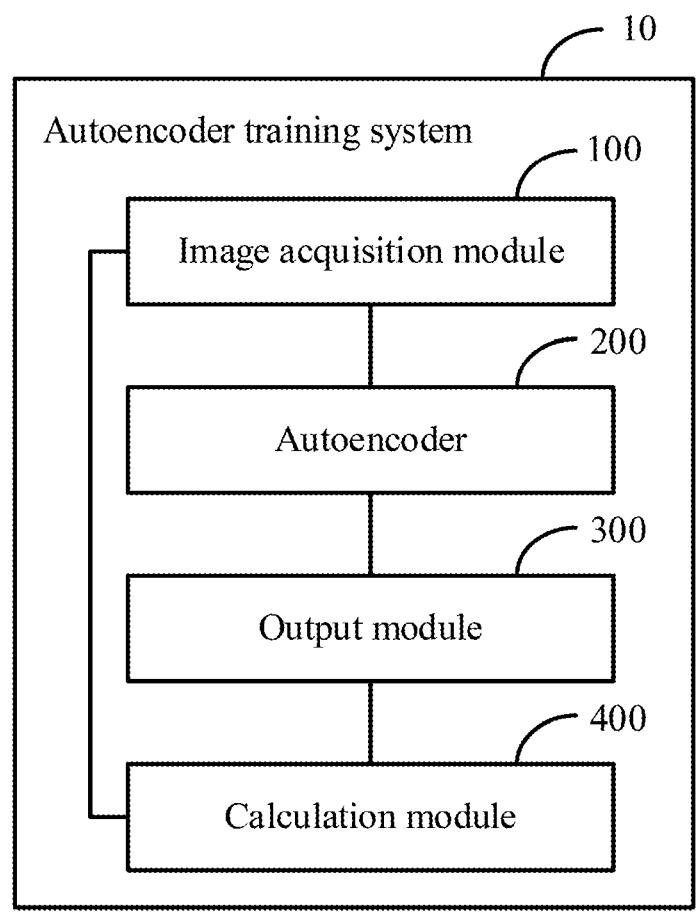
FIG. 1 illustrates a block diagram of an embodiment of an autoencoder training system according to the present disclosure.

Multiple embodiments are described in the present disclosure, but the description is exemplary rather than limiting, and there may be more embodiments and implementable solutions within the scope of the embodiments described in the present disclosure. Although many possible combinations of features are shown in the drawings and discussed in the detailed description, many other combinations of the disclosed features are also possible. Unless specifically limited, any feature or element of any embodiment may be used in combination with or in place of any other feature or element of any other embodiment.

When describing representative embodiments, the specification may present methods and/or processes as a specific sequence of steps. However, to the extent that the method or process does not depend on the specific order of steps described in the present disclosure, the method or process should not be limited to the specific order of steps described. As understood by those of ordinary skills in the art, other orders of steps are also possible. Therefore, the specific order of steps set forth in the specification should not be interpreted as limitation to the claims. In addition, the claims for the method and/or process should not be limited to the steps performed in the order as written, and those of skill in the art may readily understand that these orders may vary and still remain within the essence and scope of the embodiments of the present disclosure.

Unless otherwise defined, technical terms or scientific terms used in the embodiments shall have common meanings as construed by those of ordinary skills in the art to which the present disclosure pertains. The terms "first", "second" and the like used in the embodiments of the present disclosure do not represent any order, quantity, or importance, but are merely used to distinguish different components. The terms "include", "contain" or the like mean that elements or articles appearing before such terms cover elements or articles listed after the terms and their equivalents without excluding other elements or articles. The terms "connect", "link" or the like are not limited to physical or mechanical connection, but may include electrical connections, whether direct or indirect.

A method for training an autoencoder and an electronic device are provided, to train the autoencoder according to images captured by a stereo camera, the trained autoencoder can output depth images according to the images captured by a monocular camera.

Referring to FIG. 1, the autoencoder training system 10 includes an image acquisition module 100, an autoencoder 200, an output module 300, and a calculation module 400.

In one embodiment, the image acquisition module 100 can include a stereo camera as well as two or more independent cameras. The autoencoder training system 10 can perform model training through the stereoscopic images obtained by the image acquisition module 100. The stereo camera includes a binocular camera, that is, a camera on the left and a camera on the right, which can obtain images from different perspectives on the left and right (hereinafter referred to as the left image and the right image).

In one embodiment, the image information as the vehicle is in motion may be obtained through the image acquisition module 100. The image information may include image information of the vehicle in different scenarios, such as closed test sections, highway sections, and urban road sections etc., so as to improve the performance of the autoencoder training system 10 for different scenarios of travel. The adaptability of the scene is not limited.

In some embodiments, when the image acquisition module 100 obtains image information as the vehicle is in motion, a timestamp is added to the obtained image. The image acquisition module 100 may add a timestamp t to the image obtained at the time t, and add a timestamp t+1 to an image obtained at time t+1.

In one embodiment, the image acquisition module 100 transmits the left images captured by the stereo camera to the autoencoder 200. In some embodiments, the autoencoder 200 is an artificial neural network capable of learning an efficient representation of the input data through unsupervised learning. In some embodiments, the autoencoder 200 is a pre-trained autoencoder, and can output a stereo disparity map at time t according to the input left image at time t, and transmit the stereo disparity map to the output module 300.

It can be understood that the disparity map is the position deviation of the pixels of the images of the same scene captured by two cameras. The corresponding predicted right image can be obtained by adding the left image and the corresponding stereo disparity map.

It can be understood that the left image, right image, and disparity map in the autoencoder training system 10 are all represented by matrices. Taking the images obtained by the image acquisition module 100 in grayscale as an example, the row of the matrix corresponds to the height of the image (unit of the height is pixel), the column of the matrix corresponds to the width of the image (unit of the width is pixel), the element of the matrix corresponds to the pixel of the image, the value of the element of the matrix is the gray scale value of the pixel. In some embodiments, the image obtained by the image acquisition module 100 may also be a binary image or an RGB image, which is not limited.

In one embodiment, the output module 300 may perform calculation according to the left image at time t and the stereo disparity map at time t, so as to obtain the predicted right image at time t. In some embodiments, the output module 300 may add the matrix of the left image at time t and the matrix of the stereo disparity map at time t, to obtain the matrix of the predicted right image at time t. The output module 300 outputs the matrix of the predicted right image at time t to the calculation module 400.

In one embodiment, the image acquisition module 100 transmits the right image captured by the stereo camera to the calculation module 400. The calculation module 400 performs a mean square error (MSE) operation on the matrix of the predicted right image at time t and the matrix of the actual right image at time t, to calculate a first MSE between the matrix of the predicted right image at time t and the matrix of the actual right image matrix at time t. The first MSE can be calculated by the following formula (1):

$$MSE = \frac{1}{n}\sum_{i=1}^{n}(y_i - \hat{y}_i)^2, \quad (1)$$

in formula (1), n is the quantity of numbers in the image matrix, $y_i$ is the value of the pixel point in the predicted right image at time t, and $\hat{y}_i$ is the value of the pixel point in the actual right image at time t.

It can be understood that, the smaller the value of the first MSE, the smaller is the difference between the predicted right image matrix at time t and the actual right image matrix at time t. When the value of the first MSE is 0, it indicates that the predicted right image matrix at time t is the same as the actual right image matrix at time t.

In some embodiments, a first MSE threshold may be set by the calculation module 400. If the first MSE value calculated by the calculation module 400 is less than the first MSE threshold, this indicates that the training of the autoencoder is completed.

In some embodiments, the calculation module 400 may also be configured to determine completion of autoencoder training when the first MSE is continuously less than the first MSE threshold. For example, if the first MSE value calculated by the calculation module 400 is less than the first MSE threshold three sequential times, it indicates that the training of the autoencoder is completed.

In some embodiments, the autoencoder 200 outputs the temporal disparity map between the left image at time t and the left image at time t+1 according to the input left image at time t, and transmits the temporal disparity map to the output module 300.

In some embodiments, the output module 300 may perform calculation according to the left image at time t and the temporal disparity map at time t+1, to calculate the predicted left image at time t+1. In some embodiments, the output module 300 may add the matrix of the left image at time t and the matrix of the temporal disparity map at time t+1, to obtain the matrix of the predicted left image at time t+1. The output module 300 transmits the matrix of the predicted left image at time t+1 to the calculation module 400.

In some embodiments, the image acquisition module 100 transmits the matrix of the actual left image at time t+1 captured by the stereo camera to the calculation module 400. The calculation module 400 calculates a second MSE between the matrix of the predicted left image at time t+1 and the matrix of the actual left image at time t+1 by using the formula (1). It can be understood that the calculation method of the second MSE is the same as the calculation method of the first MSE, and details are not described again.

It can be understood that a second MSE threshold can be preset by the calculation module 400, and the second MSE threshold is set in the same manner as the first MSE threshold, and details are not repeated.

In some embodiments, the calculation module 400 determines whether the training of the autoencoder 200 is completed according to the first MSE threshold and the second MSE threshold. If the first MSE is less than the first MSE threshold and the second MSE is greater than the second MSE threshold, the calculation module 400 may determine that training of the autoencoder 200 is not completed, and the autoencoder training system 10 continues to train the autoencoder 200, until the second MSE is below the second MSE threshold. If the first MSE is less than the first MSE threshold or the second MSE is less than the second MSE threshold, the calculation module 400 can determine that the training of the autoencoder 200 is completed.

In some embodiments, the image acquisition module 100 may also input the right image into the autoencoder 200, and the autoencoder 200 outputs a stereo disparity map for the right image according to the input right image, and then compares the stereo disparity map with the left image and calculates the MSE. The specific calculation method is the same as the calculation method of the first MSE, which is not repeated.

The depth image model trained by the autoencoder training system 10 can generate a stereo disparity map and a temporal disparity map according to the input image obtained by the monocular camera.

Figure 2:
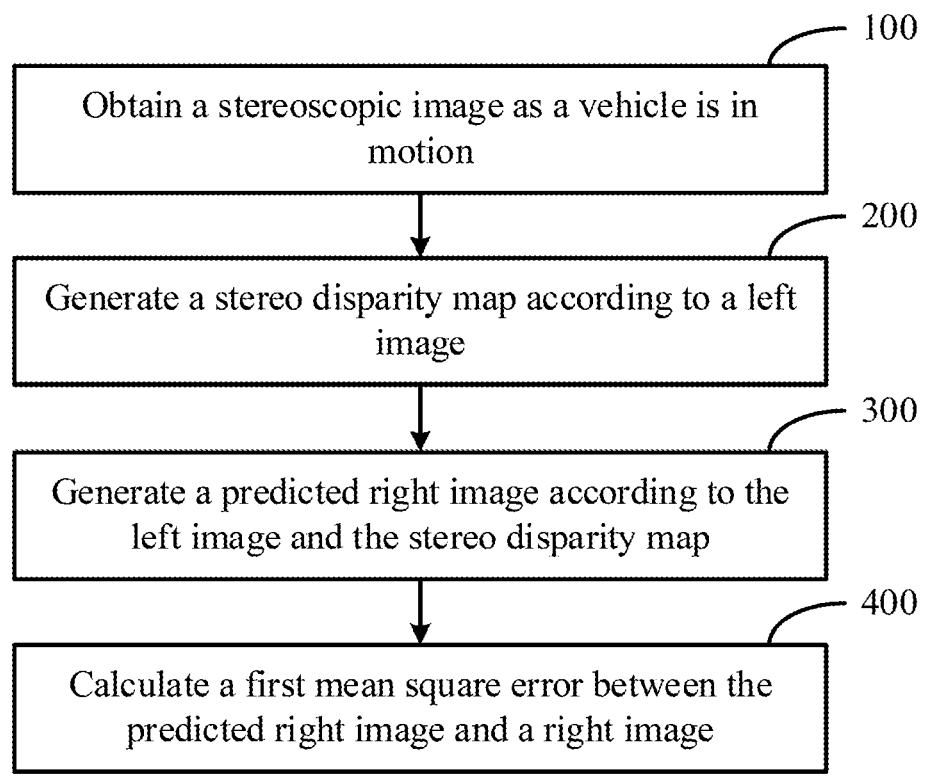
FIG. 2 illustrates a flowchart of an embodiment of a method for training an autoencoder according to the present disclosure.

FIG. 2 illustrates a flowchart of an embodiment of a method for training an autoencoder. The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 100.

At block 100, obtaining a stereoscopic image as the vehicle is in motion.

In some embodiments, the image acquisition module 100 obtains the stereoscopic image of the vehicle in motion, the stereoscopic image includes a left image and a right image.

At block 200, generating a stereo disparity map according to the left image.

In some embodiments, the autoencoder 200 generates the stereo disparity map according to the left image in the stereoscopic image.

At block 300, generating a predicted right image according to the left image and the stereo disparity map.

In some embodiments, the output module 300 generates the predicted right image according to the left image and the stereo disparity map.

At block 400, calculating a first MSE between the predicted right image and the right image.

In some embodiments, the calculation module 400 calculates the first MSE between the predicted right image and the right image.

Figure 3:
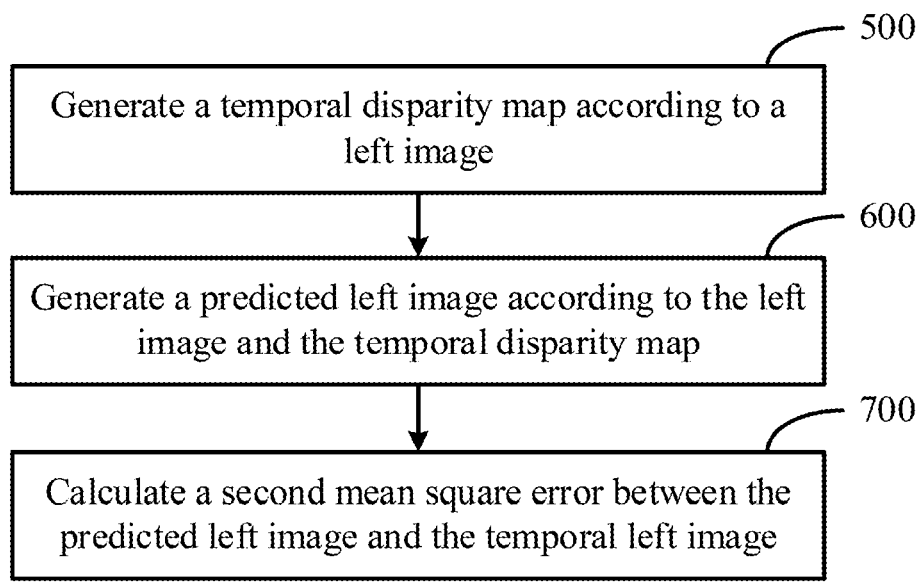
FIG. 3 illustrates a flowchart of another embodiment of a method for training an autoencoder according to the present disclosure.

FIG. 3 illustrates a flowchart of another embodiment of a method for training an autoencoder. The method is provided by way of example, as there are a variety of ways to carry out the method. Each block shown in FIG. 3 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 500.

At block 500, generating a temporal disparity map according to the left image and temporal information.

In some embodiments, the autoencoder 200 generates the temporal disparity map according to the left image and the temporal information.

At block 600, generating a predicted left image according to the left image and the temporal disparity map.

In some embodiments, the output module 300 generates the predicted left image according to the left image and the temporal disparity map.

At block 700, calculating a second MSE between the predicted left image and the temporal left image.

In some embodiments, the calculation module 400 calculates the second MSE between the predicted left image and the temporal left image.

Figure 4:
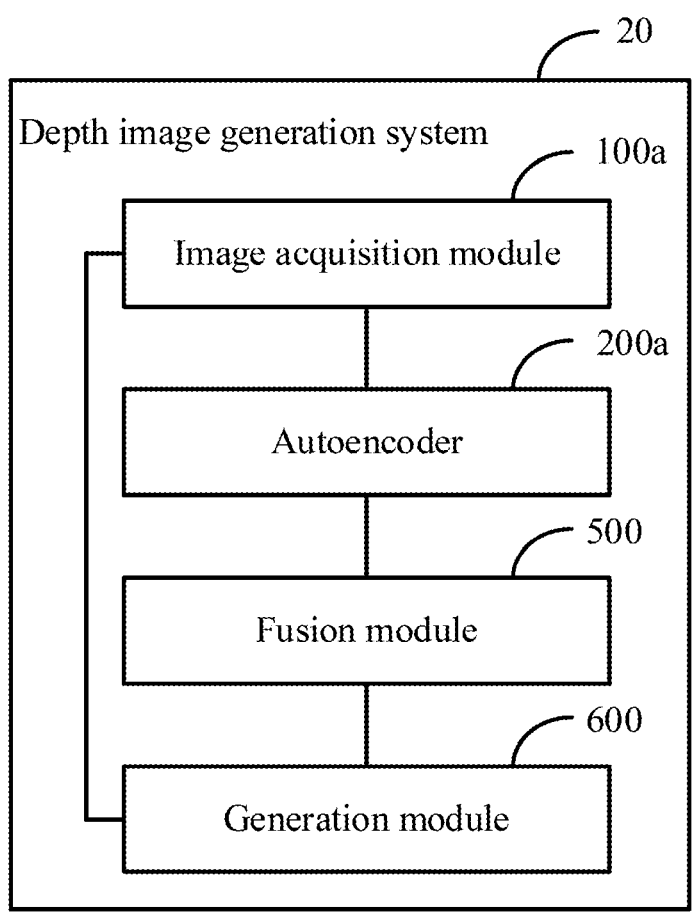
FIG. 4 illustrates a block diagram of an embodiment of a depth image generation system according to the present disclosure.

Referring to FIG. 4, a depth image generation system 20 includes an image acquisition module 100a, an autoencoder 200a, a fusion module 500, and a generation module 600.

In some embodiments, the image acquisition module 100a can be a monocular camera, the image acquisition module 100a obtains image information as the vehicle is in motion, and transmits the image information to the autoencoder 200a.

In some embodiments, the autoencoder 200a is the autoencoder trained by the autoencoder training system 10 in FIG. 1.

In some embodiments, the autoencoder 200 generates a stereo disparity map and a temporal disparity map according to the image information obtained by the image acquisition module 100a.

In some embodiments, the fusion module 500 performs fusion processing of disparity map on the stereo disparity map and the temporal disparity map, to generate a fusion disparity map. It can be understood that, when the fusion module 500 performs fusion processing of disparity map, different values of weighting can be preset for the stereo disparity map and the temporal disparity map, which is not limited.

In some embodiments, the generation module 600 generates the depth image according to the fusion disparity map generated by the fusion module 500. The method for generating the depth image according to the disparity map may be performed according to the encoding method in related prior art, which is not limited.

Figure 5:
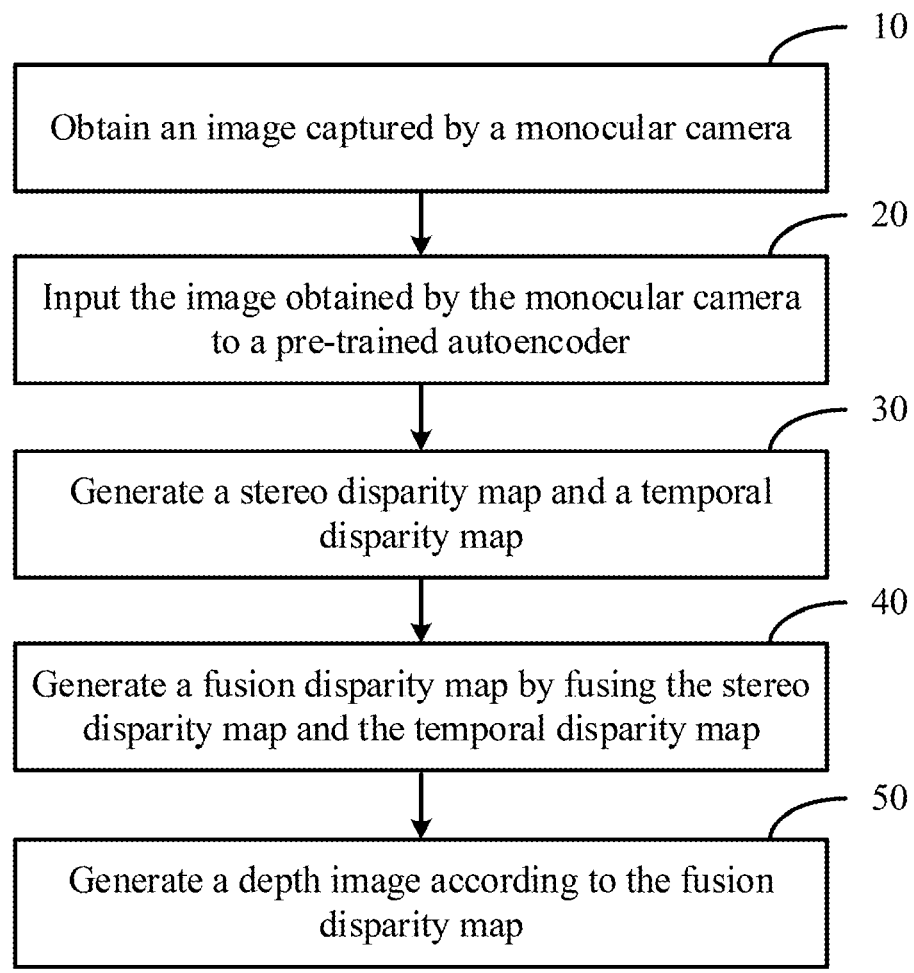
FIG. 5 illustrates a flowchart of an embodiment of a method for generating depth images according to the present disclosure.

FIG. 5 illustrates a flowchart of another embodiment of a method for generating a depth image. The method is provided by way of example, as there are a variety of ways to carry out the method. Each block shown in FIG. 5 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 10.

At block 10, obtaining an image captured by a monocular camera.

In some embodiments, the image acquisition module 100a obtains the image acquired by the monocular camera.

At block 20, inputting the images obtained by the monocular camera to the pre-trained autoencoder.

In some embodiments, the image acquisition module 100a outputs the captured image to the autoencoder 200a.

At block 30, generating a stereo disparity map and a temporal disparity map.

In some embodiments, the autoencoder 200a generates the stereo disparity map and the temporal disparity map.

At block 40, generating a fusion disparity map by fusing the stereo disparity map and the temporal disparity map.

In some embodiments, the fusion module 500 fuses the stereo disparity map and the temporal disparity map to generate the fusion disparity map.

At block 50, generating a depth image according to the fusion disparity map.

In some embodiments, the generation module 600 generates the depth image according to the fusion disparity map. The depth image is generated by using the depth image generation method in related prior art, which is no limited.

Figure 6:
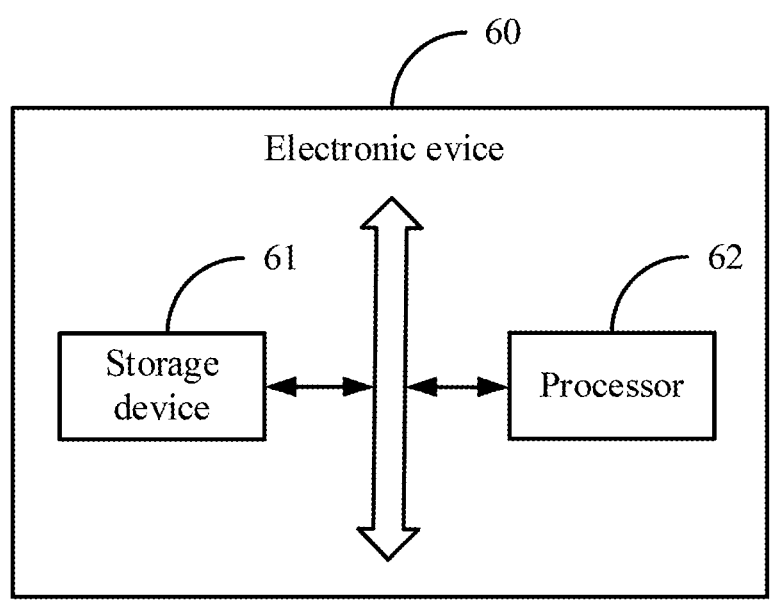
FIG. 6 illustrates a block diagram of an embodiment of an electronic device according to the present disclosure.

FIG. 6 illustrates an electronic device 60 in one embodiment. The electronic device 60 includes, but is not limited to, a processor 62, a storage device 61, and a computer program. FIG. 6 illustrates only one example of the electronic device 60. Other examples can include more or fewer components than as illustrated or can have a different configuration of the various components in other embodiments.

The processor 62 can be a central processing unit (CPU), a microprocessor, or other data processor chip that performs functions in the electronic device 60.

In one embodiment, the storage device 61 can include various types of non-transitory computer-readable storage mediums. For example, the storage device 61 can be an internal storage system, such as a flash memory, a random access memory (RAM) for the temporary storage of information, and/or a read-only memory (ROM) for permanent storage of information. The storage device 61 can also be an external storage system, such as a hard disk, a storage card, or a data storage medium.

The storage device 61 stores instructions, and the processor 62 executes the computer program stored in the storage device 61 for implementing the method for training an autoencoder and the method for generating a depth image provided in the embodiments of the present disclosure. The computer program includes a training program, a generation program, and instructions.

Upon execution of the instructions stores in the storage device 301, the processor 302 is configured to:

obtain a stereoscopic image as a vehicle is in motion, the stereoscopic image includes a left image and a right image;

generate a stereo disparity map according to the left image;

generate a predicted right image according to the left image and the stereo disparity map; and calculate a first MSE between the predicted right image and the right image.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. An electronic device comprising:
at least one processor; and
a storage device coupled to the at least one processor and that stores instructions, which when executed by the at least one processor, cause the at least one processor to:
obtain a stereoscopic image as a vehicle is in motion, the stereoscopic image comprising a left image and a right image;
generate a stereo disparity map according to the left image;
generate a predicted right image according to the left image and the stereo disparity map;
calculate a first mean square error (MSE) between the predicted right image and the right image;
determine whether the first MSE is less than a first MSE threshold;
in response that the first MSE is less than the first MSE threshold, determine that training of an autoencoder for generating a depth image is completed;
input an image obtained by a monocular camera to the autoencoder, and generate a stereo disparity map and a temporal disparity map corresponding to the image obtained by the monocular camera; and
generate a fusion disparity map by fusing the stereo disparity map and the temporal disparity map corresponding to the image obtained by the monocular camera, and generate a depth image corresponding to the image obtained by the monocular camera according to the fusion disparity map.

2. The electronic device according to claim 1, wherein the at least one processor is further caused to:
generate a temporal disparity map according to the left image and temporal information;
generate a predicted left image according to the left image and the temporal disparity map; and
calculate a second MSE between the predicted left image and the temporal left image.

3. The electronic device according to claim 2, wherein the at least one processor is further caused to:
generate a stereo disparity map according to the right image; and
generate a predicted left image according to the right image and the stereo disparity map.

4. The electronic device according to claim 3, wherein the at least one processor is further caused to:
generate a temporal disparity map according to the right image; and
generate a predicted right image according to the right image and the temporal disparity map.

5. The electronic device according to claim 1, wherein the at least one processor is further caused to:
preset a second MSE threshold;
determine whether the second MSE is less than the second MSE threshold; and in response that the second MSE is less than the second MSE threshold, determine that the training of the autoencoder is completed.

6. The electronic device according to claim 5, wherein the at least one processor is further caused to:
in response that the first MSE is less than the first MSE threshold, or the second MSE is less than the second MSE threshold, determine that the training of the autoencoder is completed.

7. A method for training an autoencoder implemented in an electronic device comprising:
obtaining a stereoscopic image as a vehicle is in motion, the stereoscopic image comprising a left image and a right image;
generating a stereo disparity map according to the left image;
generating a predicted right image according to the left image and the stereo disparity map;
calculating a first MSE between the predicted right image and the right image;
determining whether the first MSE is less than a first MSE threshold;
in response that the first MSE is less than the first MSE threshold, determining that training of an autoencoder for generating a depth image is completed;
inputting an image obtained by a monocular camera to the autoencoder, and generating a stereo disparity map and a temporal disparity map corresponding to the image obtained by the monocular camera; and
generating a fusion disparity map by fusing the stereo disparity map and the temporal disparity map corresponding to the image obtained by the monocular camera, and generating a depth image corresponding to the image obtained by the monocular camera according to the fusion disparity map.

8. The method according to claim 7, wherein further comprising:
generating a temporal disparity map according to the left image and temporal information;
generating a predicted left image according to the left image and the temporal disparity map; and
calculating a second MSE between the predicted left image and the temporal left image.

9. The method according to claim 8, further comprising:
generating a stereo disparity map according to the right image; and
generating a predicted left image according to the right image and the stereo disparity map.

10. The method according to claim 9, further comprising:
generating a temporal disparity map according to the right image; and
generating a predicted right image according to the right image and the temporal disparity map.

11. The method according to claim 7, further comprising:
presetting a second MSE threshold;
determining whether the second MSE is less than the second MSE threshold; and
in response that the second MSE is less than the second MSE threshold, determining that the training of the autoencoder is completed.

12. The method according to claim 11, further comprising:
in response that the first MSE is less than the first MSE threshold, or the second MSE is less than the second MSE threshold, determining that the training of the autoencoder is completed.

13. A non-transitory computer-readable storage medium having instructions stored thereon, when the instructions are executed by a processor of an electronic device, the processor is configured to perform a method for training an autoencoder, wherein the method comprises:
- obtaining a stereoscopic image as a vehicle is in motion, the stereoscopic image comprising a left image and a right image;
- generating a stereo disparity map according to the left image;
- generating a predicted right image according to the left image and the stereo disparity map;
- calculating a first MSE between the predicted right image and the right image;
- determining whether the first MSE is less than a first MSE threshold;
- in response that the first MSE is less than the first MSE threshold, determining that training of an autoencoder for generating a depth image is completed;
- inputting an image obtained by a monocular camera to the autoencoder, and generating a stereo disparity map and a temporal disparity map corresponding to the image obtained by the monocular camera; and
- generating a fusion disparity map by fusing the stereo disparity map and the temporal disparity map corresponding to the image obtained by the monocular camera, and generating a depth image corresponding to the image obtained by the monocular camera according to the fusion disparity map.

14. The non-transitory computer-readable storage medium according to claim 13, wherein the method further comprises:
- generating a temporal disparity map according to the left image and temporal information;
- generating a predicted left image according to the left image and the temporal disparity map; and
- calculating a second MSE between the predicted left image and the temporal left image.

15. The non-transitory computer-readable storage medium according to claim 13, wherein the method further comprises:
- presetting a second MSE threshold;
- determining whether the second MSE is less than the second MSE threshold; and
- in response that the second MSE is less than the second MSE threshold, determining that the training of the autoencoder is completed.

* * * * *